(12) United States Patent
Chao et al.

(10) Patent No.: US 9,353,817 B2
(45) Date of Patent: *May 31, 2016

(54) ISOLATION SYSTEM AND METHOD THEREOF

(75) Inventors: Darren Chao, Norwood, MA (US);
Hamid Shaidani, Randolph, MA (US);
Ramkumar Krishnan, Watertown, MA (US)

(73) Assignee: Kinematic Systems, Inc., Roslindale, MA (US)

( * ) Notice: Subject to any disclaimer, the term of this patent is extended or adjusted under 35 U.S.C. 154(b) by 437 days.

This patent is subject to a terminal disclaimer.

(21) Appl. No.: 13/599,710

(22) Filed: Aug. 30, 2012

(65) Prior Publication Data
US 2014/0061424 A1    Mar. 6, 2014

(51) Int. Cl.
| F16F 13/00 | (2006.01) |
| F16F 9/04 | (2006.01) |
| F16F 15/027 | (2006.01) |
| E04B 1/98 | (2006.01) |

(52) U.S. Cl.
CPC ............ *F16F 9/0472* (2013.01); *F16F 15/0275* (2013.01); *E04B 1/98* (2013.01); *F16F 13/00* (2013.01)

(58) Field of Classification Search
USPC .................. 248/638, 562, 567, 580; 267/136, 267/140.14, 140.15, 64.19, 64.23, 64.27, 267/64.11–64.28
See application file for complete search history.

(56) References Cited

U.S. PATENT DOCUMENTS

| 4,531,699 | A |   | 7/1985 | Pinson |  |
| 4,735,296 | A |   | 4/1988 | Pinson |  |
| 4,796,873 | A |   | 1/1989 | Schubert |  |
| 5,061,541 | A |   | 10/1991 | Gertel |  |
| 5,348,266 | A |   | 9/1994 | Gertel et al. |  |
| 5,564,537 | A | * | 10/1996 | Shoureshi | 188/380 |
| 5,931,441 | A | * | 8/1999 | Sakamoto | 248/550 |
| 5,962,104 | A |   | 10/1999 | Gertel et al. |  |
| 6,123,312 | A |   | 9/2000 | Dai |  |
| 6,209,841 | B1 | * | 4/2001 | Houghton et al. | 248/550 |
| 6,213,442 | B1 | * | 4/2001 | Ivers et al. | 248/550 |
| 7,114,710 | B2 |   | 10/2006 | Motz |  |
| 2010/0001445 | A1 | * | 1/2010 | Maruyama et al. | 267/113 |

OTHER PUBLICATIONS

U.S. Appl. No. 13/599,536, Chao et al.
U.S. Appl. No. 13/599,676, Chao et al.

* cited by examiner

*Primary Examiner* — Alfred J Wujciak
(74) *Attorney, Agent, or Firm* — Iandiorio Teska & Coleman, LLP

(57) ABSTRACT

An isolation system includes a platform, a plurality of isolators for the platform electronically switchable between a soft mode of isolation resulting in a first natural frequency and a stiff mode of isolation resulting in a second natural frequency, and a controller responsive to a signal representing the frequency of a machine on the platform and configured to switch the isolator to the stiff mode of operation when the frequency of the machine approaches or reaches, the first natural frequency to avoid resonance magnification, and otherwise switch the isolation to the soft mode of operation.

10 Claims, 9 Drawing Sheets

ISOLATION SYSTEM AND METHOD THEREOF

FIELD OF THE INVENTION

This invention relates to vibration isolation.

BACKGROUND OF THE INVENTION

Vibration isolation systems typically include a platform and a plurality of isolators often one in each corner of the platform. An isolator may include a piston on a diaphragm supporting the platform. A first (top) pressurized air chamber supports the diaphragm and a second (bottom) pressurized air chamber supplies air to the first chamber and acts as a reservoir.

In some designs, stiff and soft modes of isolation are possible. Reasons to control the stiffness of the isolator include responding to loads or changes in loads on the platform. When the isolation platform is used to isolate a machine (such as a shaker) from the floor of a building, it can be desirable to adjust the stiffness of the system in real time based on the operation cycle of the machine. U.S. Pat. No. 6,123,312, for example, incorporated herein by this reference, shows a pressure regulator regulating the pressure in the second chamber based on the load on the platform. The second chamber is connected to the first chamber via an isolation controller which controls the gas flow rate from the second chamber to the first chamber. A control signal controls the isolation controller and thus the stiffness of the isolator.

In another design, a valve allows air to flow from the second chamber to the first chamber via either high or low resistance coils in order to control the stiffness of the isolator.

Other relevant prior art may include U.S. Pat. Nos. 4,796,873; 7,114,710; 4,531,699; 4,735,296; 5,061,541; 5,348,266 and 5,962,104, all of which are incorporated herein by this reference.

SUMMARY OF THE INVENTION

Transition to the stiff mode of isolation is effected in an example of the subject invention by by-passing the bottom chamber providing more rapid pressurization of the top chamber to handle, for example, moving loads.

In some examples, one more actuator subsystems are included to restrain movement of the isolator platform.

In some examples of the invention, the natural frequency of the isolation platform is adjusted based on the frequency of a machine supported by the platform.

In one aspect, an isolation system is featured. The system includes a platform, a plurality of isolators for the platform electronically switchable between a soft mode of isolation resulting in a first natural frequency and a stiff mode of isolation resulting in a second natural frequency, and a controller responsive to a signal representing the frequency of a machine on the platform and configured to switch the isolator to the stiff mode of operation when the frequency of the machine approaches or reaches, the first natural frequency to avoid resonance magnification, and otherwise switch the isolation to the soft mode of operation.

In one embodiment, the system may include one or more actuator subsystems positioned to rigidly support the platform. The controller may be further configured to activate the actuator subsystem in response to a predetermined machine frequency. The controller subsystem may be configured to process a machine control input frequency and an integrated machine frequency signal from an integration circuit. The isolator may include a flexible diaphragm for an isolation piston, a first chamber supporting the flexible diaphragm, a second chamber serving as a reservoir, and a valve connected to a supply, to the first chamber, and to the second chamber and operable to by-pass the second chamber to more quickly direct the supply to the first chamber.

In another aspect, an isolation method is featured. The method includes determining the frequency of a machine on an isolation platform subsystem, switching the isolation subsystem to a stiff mode of operation when the frequency of the machine approaches, or reaches, the natural frequency of the isolation subsystem in the soft mode of operation to avoid resonance magnification, and otherwise switching the isolation subsystem to a soft mode of operation.

In one embodiment, the method may include activating an actuator subsystem in response to a predetermined machine frequency to rigidly support the platform.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
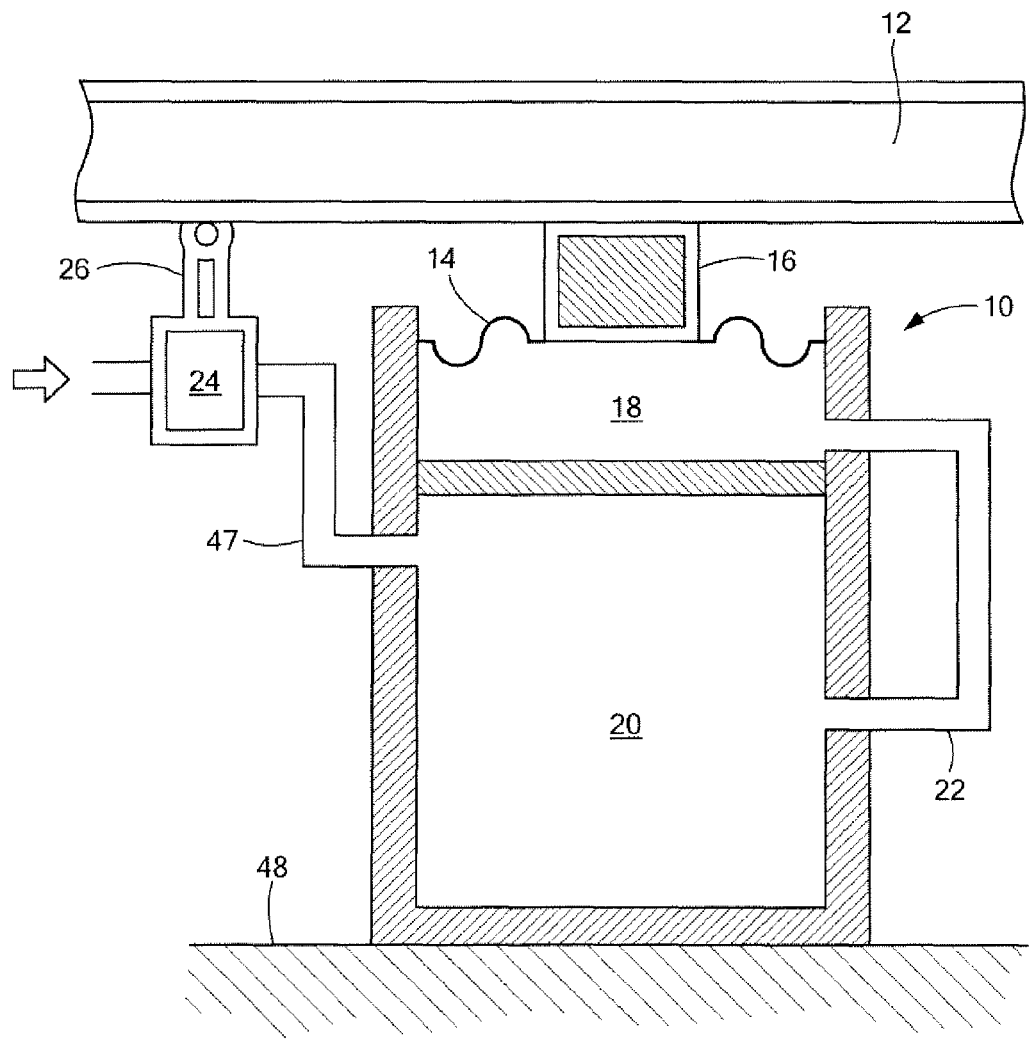
FIG. 1 is a schematic cross sectional view of a conventional isolator.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows a prior art isolator 10 for platform 12 with flexible diaphragm 14 supporting piston 16 itself supporting platform 12. Top chamber 18 is pressurized by air from bottom chamber 20 as shown via conduit 22. Supply air is directed to bottom reservoir chamber 20 via pressure regulator 24 with a lever 26 actuated by movement of platform 12.

Figure 2:
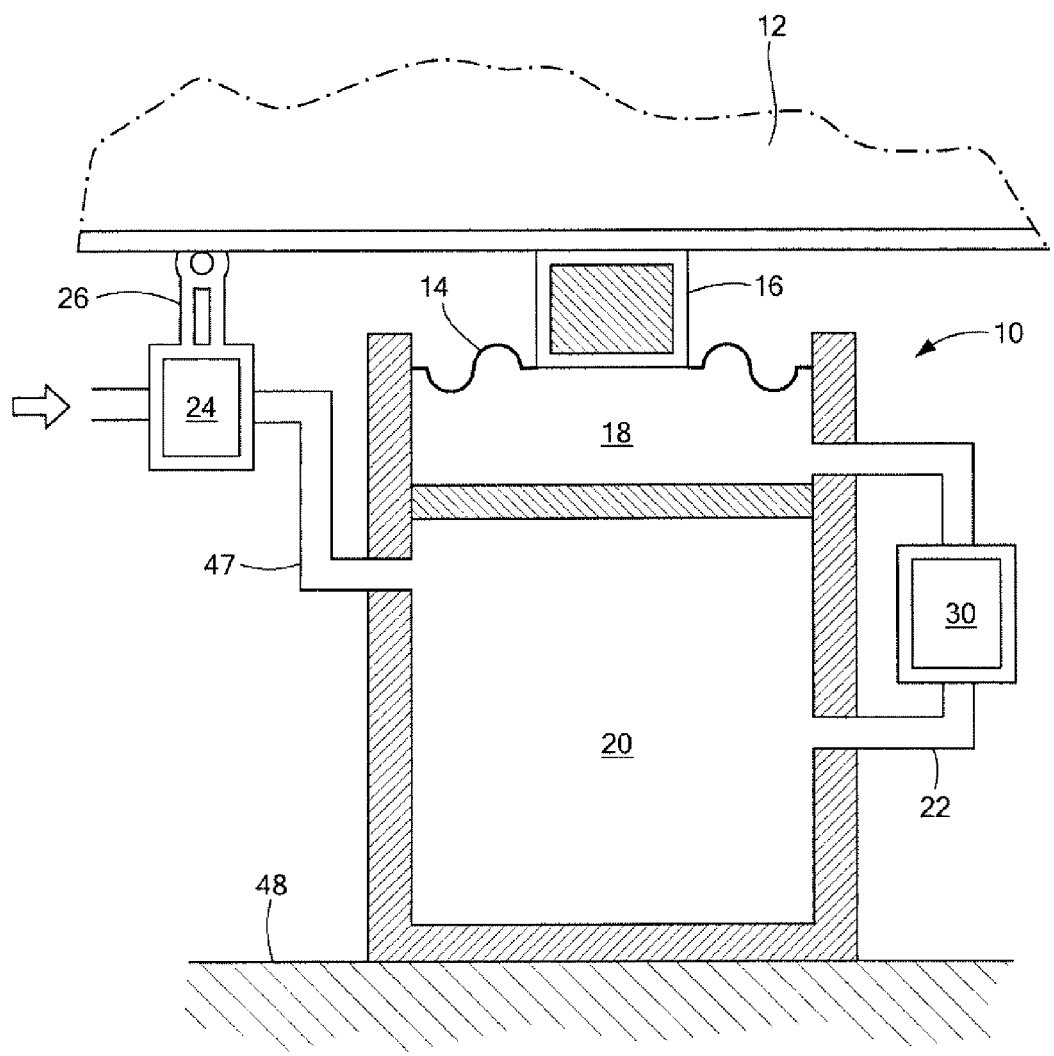
FIG. 2 is a cross sectional view of the conventional isolator shown in U.S. Pat. No. 6,123,312.

FIG. 2 shows the design of U.S. Pat. No. 6,123,312 wherein isolation controller 30 controls the gas flow rate from bottom chamber 20 to top chamber 18 based on a control signal, from the moving speed of the operating machine above the platform.

Figure 3:
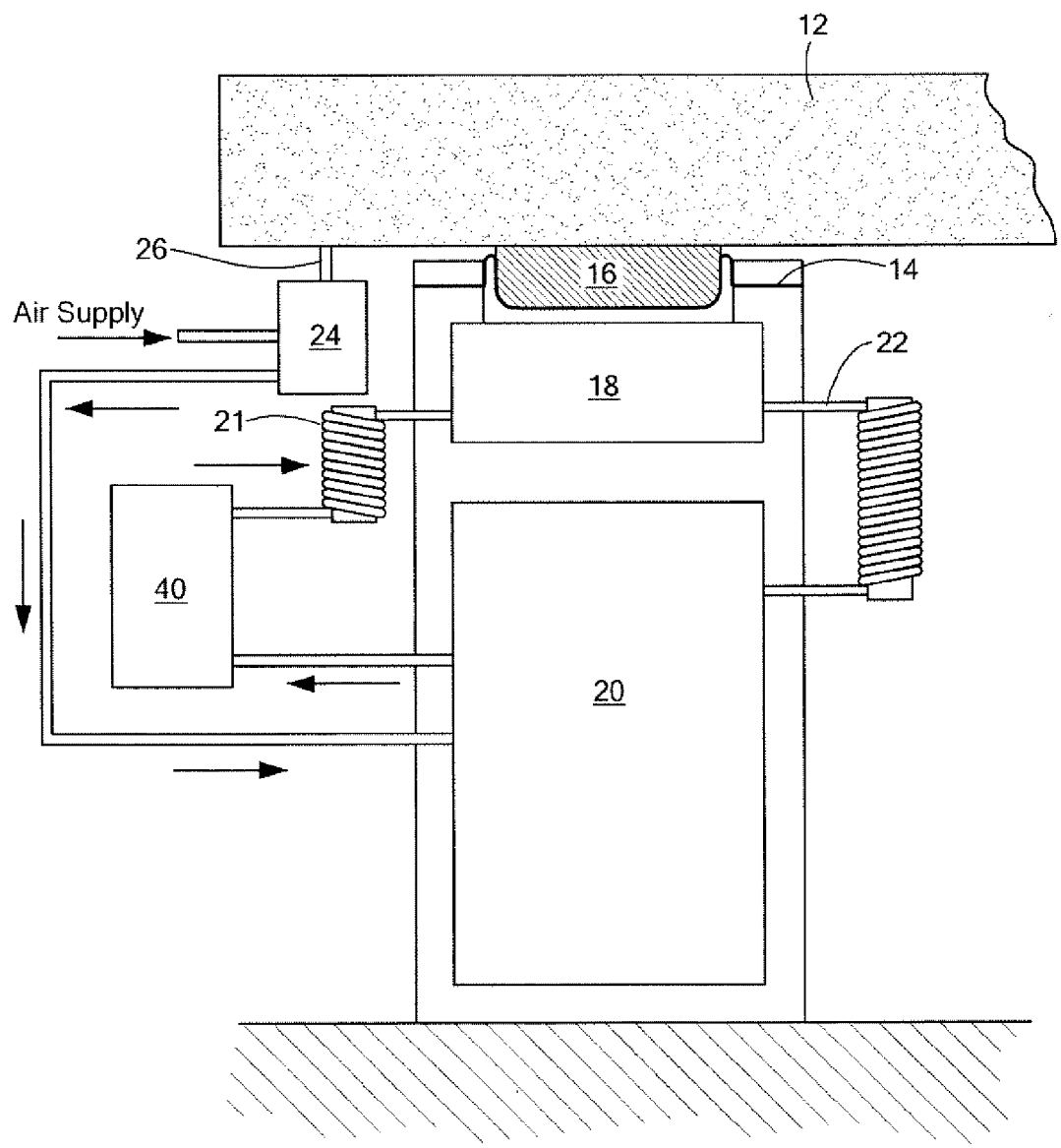
FIG. 3 is a schematic view of another conventional isolator.

In the prior art design of FIG. 3, when valve 40 is open for a soft mode of isolation, supply air is directed from bottom chamber 20 to top chamber 18 via a short damping coil 21. When valve 40 is closed for a stiff mode of operation, air is directed from bottom chamber 20 to top chamber 18 via longer damping coil 22.

Figure 4:
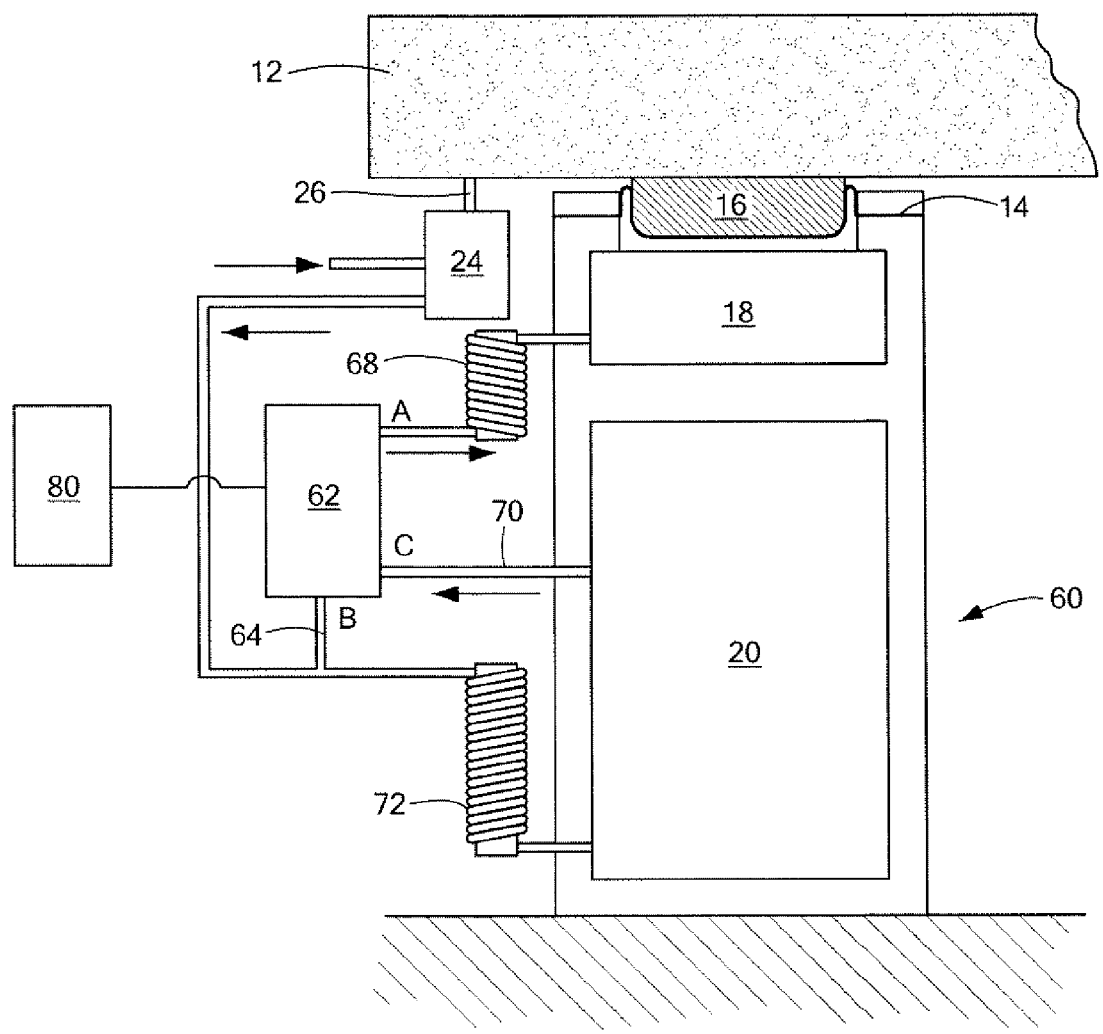
FIG. 4 is a schematic view of a fast response dual stiffness mode isolator in accordance with an example of the invention.

In one preferred embodiment, a fast response dual stiffness mode isolator 60, FIG. 4 features valve 62 connected to supply air (port B) from regulator 24 via T intersection 64. Valve 62 is connected to top chamber 18 (port A) via short damping coil 68 such as an airline coil or similar type device and to bottom chamber 20 via conduit 70 (port C).

Bottom chamber 20 is pressurized via long damping coil 72 between valve 62 and bottom chamber 20.

Top chamber 18 is pressurized in the soft mode of operation by activating valve 62 to close port B and to open port C. This may be the configuration of valve 62 when it is energized by a signal from controller 80. Pressurized air now flows from chamber 20 through ports C and A of valve 62 to top smaller chamber 18.

By closing port C and opening port B of valve 62 in the stiff mode of operation (preferably by de-energizing valve 62), bottom chamber 20 is by-passed and supply air is directed to top chamber 18 via ports B and A and short damping coil 68. At the same time, supply air is directed to bottom chamber 20 via long coil 72 to pressurize bottom chamber 20. Other restriction methods and devices can be used in lieu of coil 72 and 68.

The control signal from controller 80 to solenoid valve 62 may be based on the output signal of the operation of the machine above the platform or from signals representing loads on and/or movement of platform 12 (using velocity sensors, accelerometers, and the like, for example).

Uniquely, a restriction such as long damping coil 72 is in series between the other restriction such as short damping coil 68. By diverting air flow through both restrictions and pressurizing chambers 18 and 20 simultaneously, top chamber 18 can provide the necessary reaction force to regain the original platform level position in a shorter time. A higher stiffness is provided due to the fact that damping chamber 20 is located at the end of the air supply line with no air flow through it when the isolator is in the stiff mode.

In some examples, controller subsystem 80 further controls one or more actuator subsystems (e.g., rigid restraints) to restrain the platform vertically and/or horizontally. The controller subsystem may be a programmable logic controller, a computer, an application specific integrated circuit, or the like or a combination of these and like kinds of electronic devices interconnected by wiring and/or distributed and communicating wirelessly.

Figure 5:
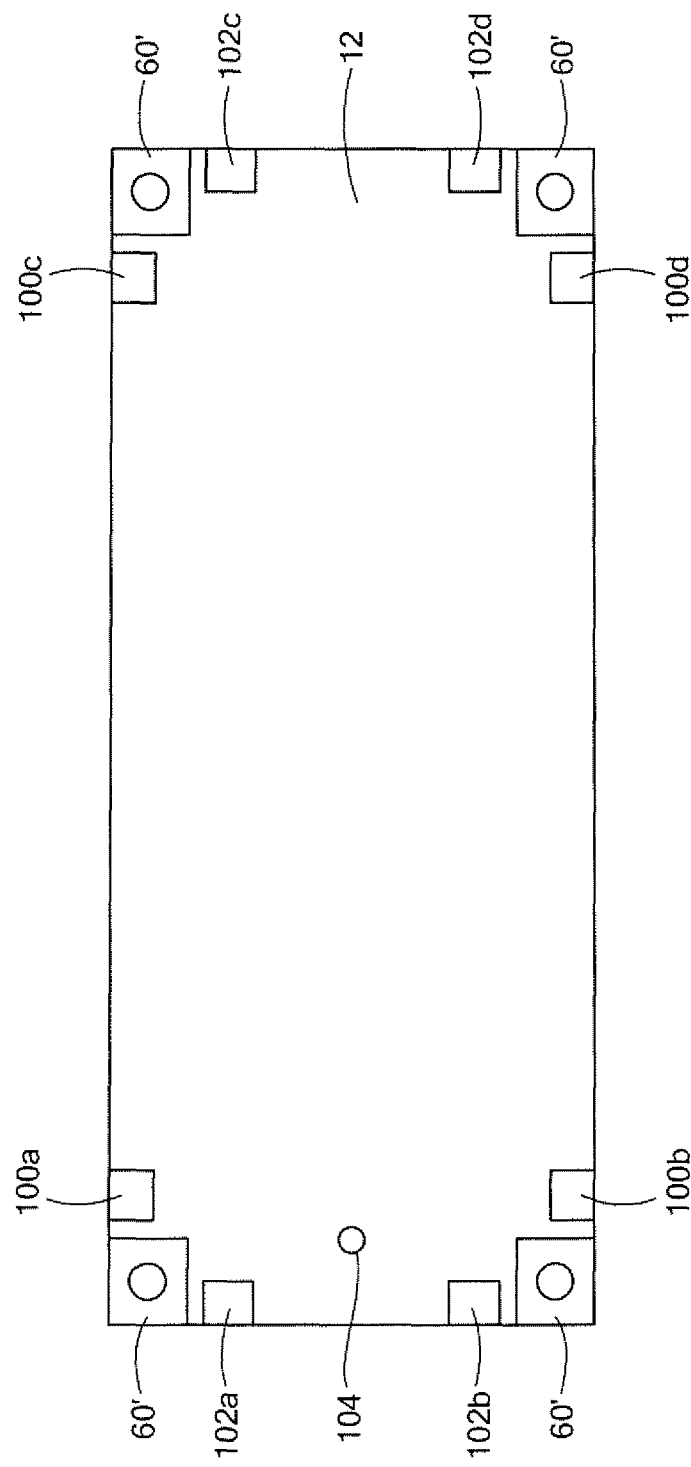
FIG. 5 is a schematic top view showing the location of isolators as shown in FIG. 4, as well as various vertical restraint subsystems in accordance with the invention.

In FIG. 5, platform 12 includes legs with an isolator 60' in each corner. Isolator 60' may be configured as discussed above with respect to FIG. 4, may be a more conventional isolator with a single mode of operation, and/or modified as discussed with respect to FIG. 7 discussed below wherein each isolator is equipped with a horizontal restraint actuator subsystem.

Also shown in this example at each corner is a downward restraint actuator subsystem 100 which prevents a platform corner from moving downward. Optionally an upward restraint actuator subsystem 102 and upward restraint actuators 102c and 102d is also provided at each corner to prevent a platform corner from moving upwards. Typically, a machine on the platform sends a signal to the controller indicating that the load is about to move. In response, the controller sends the appropriate signals to downward restrain actuator subsystem 100 and upward restraint actuator subsystem 102. There respective actuators prevent the platform from moving up or down. A similar signal may be sent to the horizontal actuator subsystem to prevent horizontal movement of the platform. The controller also signals the isolator subsystem to bleed the isolators that the load is moving away from and to fill the isolators that the load is moving towards.

In but one example, the controller in response to a signal from a payload operation on platform 12, activates downward restraint actuators 100a and 100b and upward restraint actuators 102e and 102d and all four horizontal restraint actuators. Examples of high loads triggering the activation of the restrainers include a robot art on platform 12 moving a heavy load. If the load changes to a first threshold, the controller subsystem may cause one or more isolator 60 to operate in the stiff mode as described above with respect to FIG. 4. If the load changes to a second threshold greater than the first threshold, one or more restraint actuators can be activated.

Figure 6:
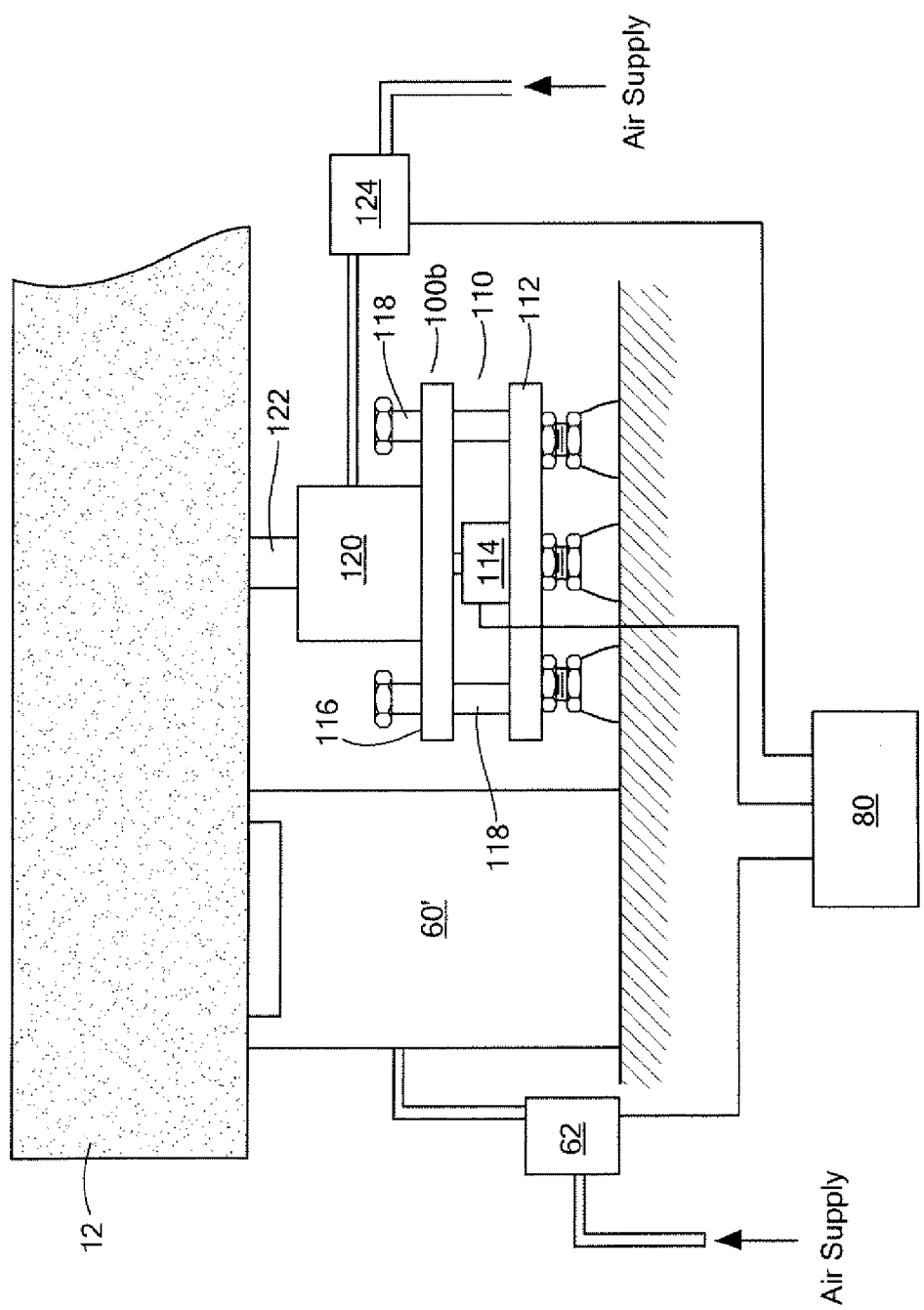
FIG. 6 is a schematic view of a downward vertical restraint subsystem in accordance with an example of the invention.

In FIG. 6, downward restraint actuator subsystem 100b includes frame 110 with plate 112 supporting load sensor 114 itself supporting sliding plate 116 on rails 118 fixed to plate 112. The sliding plate supports pneumatic actuator 120 with extendible and retractable piston 122 under platform 12. Controller subsystem 80, upon detecting a predetermined load from sensor 114 and/or upon receiving a signal from the machine on the platform, activates locking solenoid 124 to direct air to pneumatic actuator 120 driving piston 122 upward against the underside of platform 12. The appropriate isolators are then filled or bleed. When the load is no longer sensed, the piston is retracted via signal from controller subsystem 80 delivered to closed solenoid 124.

As noted above, controller subsystem 80 may also control isolator 60' via valve 62. In one example, the bottom chamber of isolator 60' can be charged while piston 122 is extended.

Figure 7:
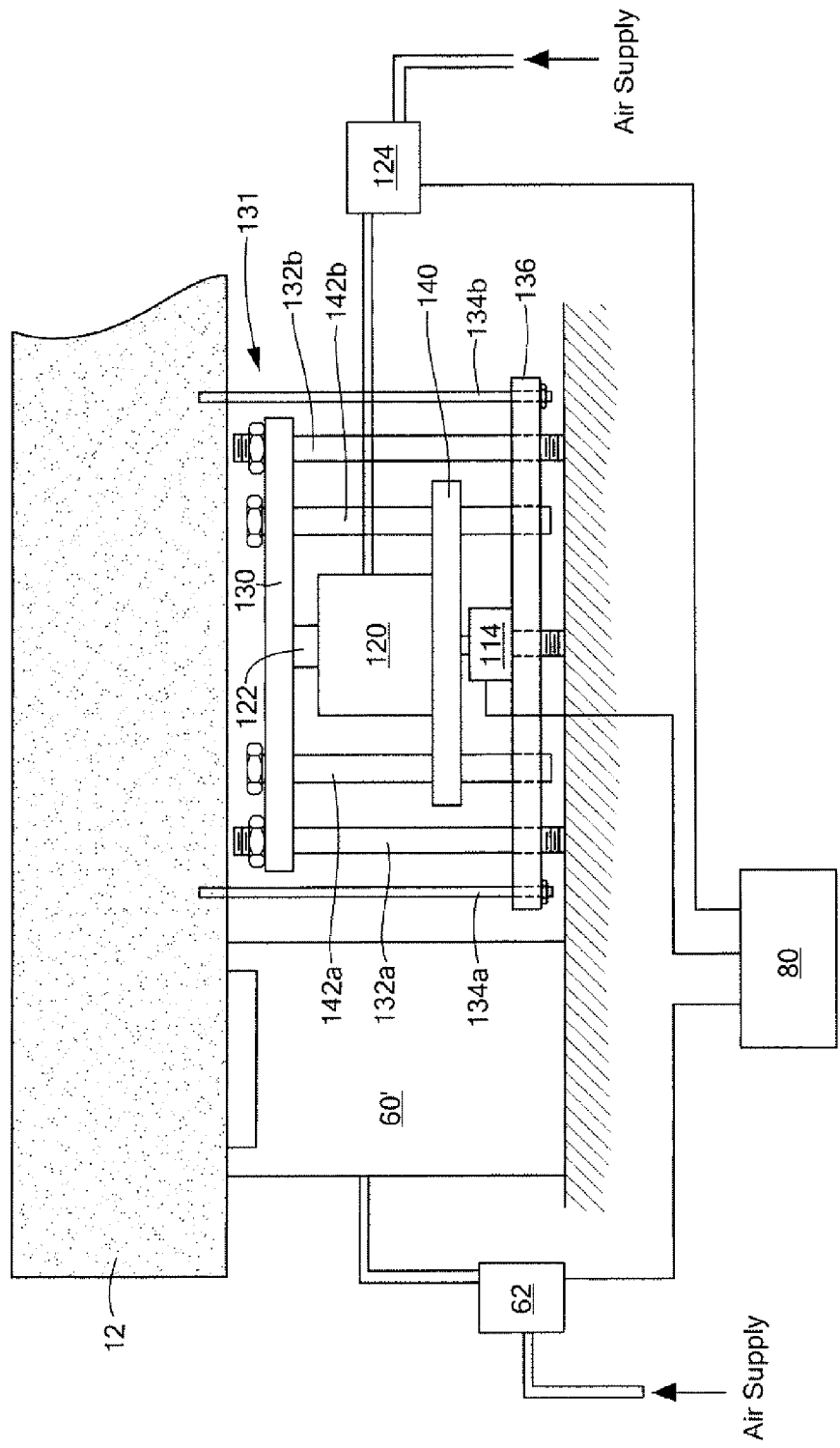
FIG. 7 is a schematic view of vertical upward restraint subsystem in accordance with an example of the invention.

FIG. 7 depicts an example of an actuator subsystem configured for vertical restraint of a platform moving upward. The frame 131 includes fixed plate 130 supported by fasteners such as those shown at 132a and 132b. Rods such as rods 134a and 134b are interconnected between the bottom of platform 12 and sliding plate 136. Sliding plate 140 moves up and down with sliding plate 136 and is guided by rails such as rails 142a and 142b. Load sensor 114 is disposed between sliding plates 140 and 136 and pneumatic actuator 120 with piston 122 is disposed between sliding plate 140 and fixed plate 136.

When platform 12 lifts up, load sensor 114 detects an increased force and sends a signal to controller subsystem 80 which then actuates pneumatic actuator 120 piston 122 which pushes sliding plates 140 and 136 down thus pulling the rods and platform 12 down. The machine on the platform may also send a signal to controller subsystem 80 to actuate pneumatic actuator 120.

Figure 8:
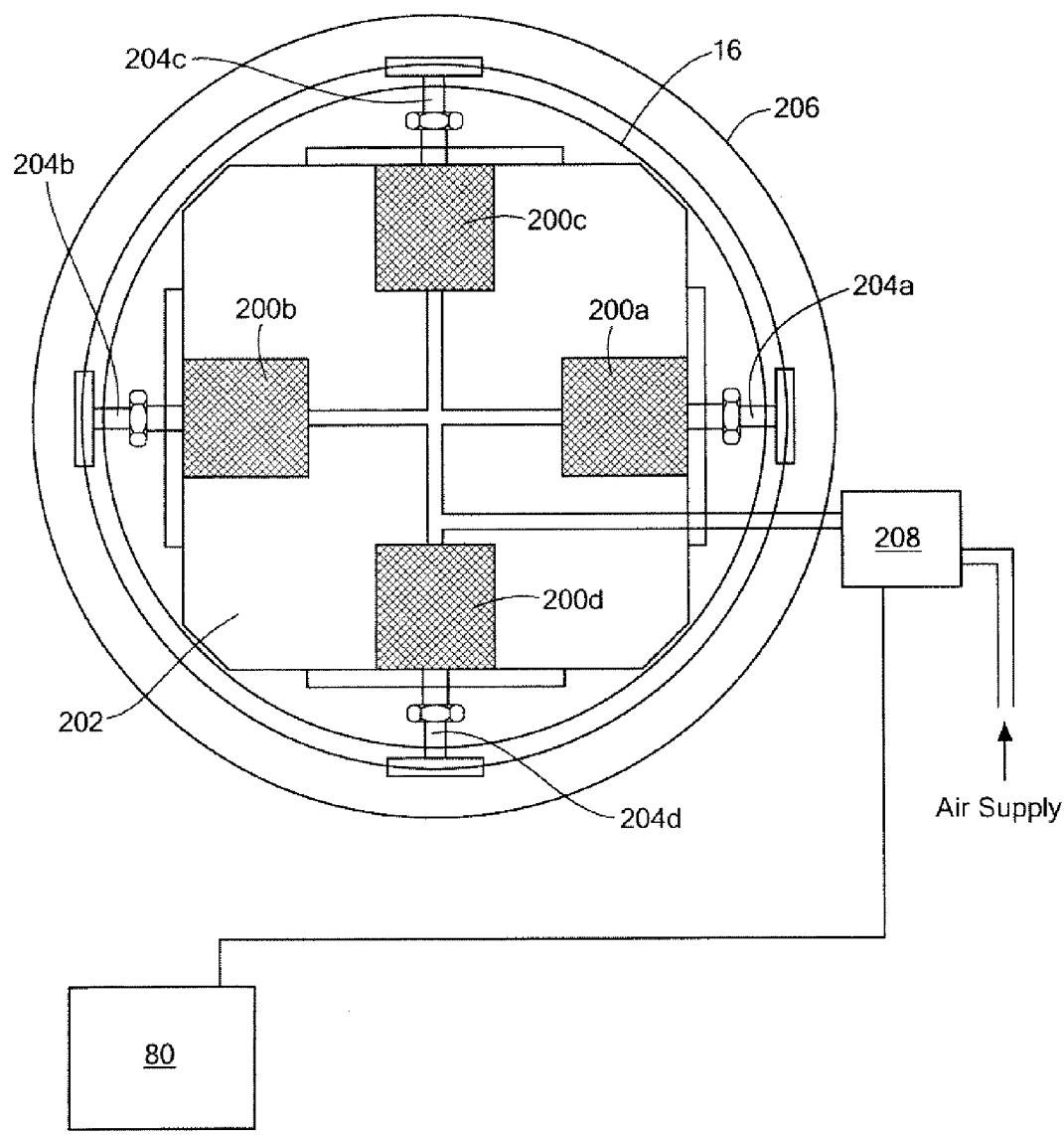
FIG. 8 is a schematic top view of an example of a horizontal restraint subsystem in accordance with the invention.

FIG. 8 depicts an example of an actuator subsystem configured for horizontal restraint. Opposing pairs of pneumatic actuators 200a and 200b and 200c and 200d are located in frame block 202 and each have an extendible and retractable piston 204a, 204b, 204c, and 204d.

Block 202 is preferably partially within or coupled to the top of piston 16, FIG. 4, between it and the underside of the platform. The actuator pistons 204, when extended, press on a structure coupled to the platform leg such as clamping ring 206.

When controller subsystem 80 activates locking solenoid 208, air is supplied to actuators 200a-200d and pistons 204a-204d extend arresting horizontal movement of the piston and thus the platform. When the pistons retract by closing solenoid 208, normal isolation resumes. Typically, each platform leg isolator is equipped with such a horizontal restraint system automatically activated when the vertical restraint subsystem is activated.

Figure 9:
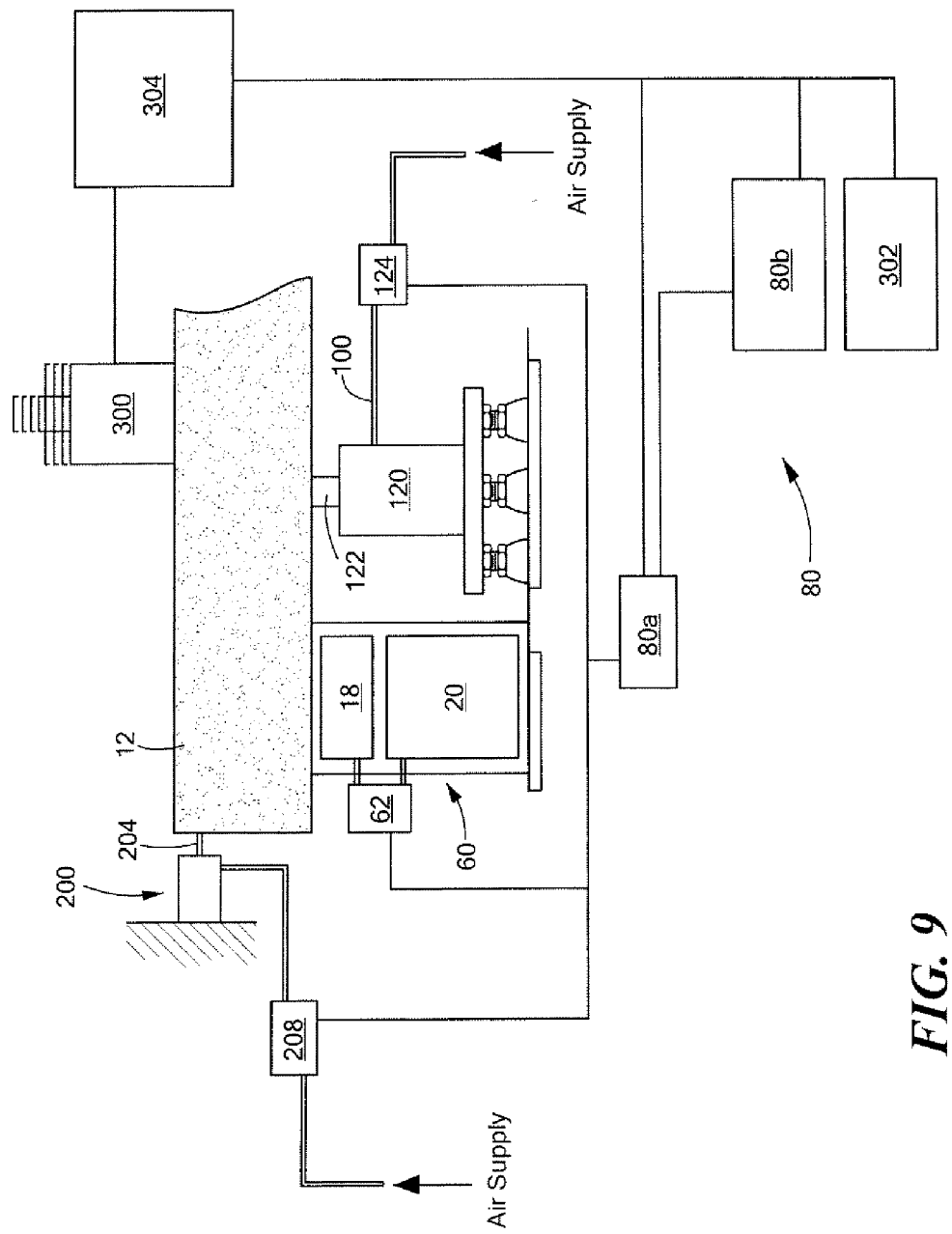
FIG. 9 is a schematic view showing an example of a resonance free isolation system in accordance with an example of the invention.

FIG. 9 shows an isolation subsystem with pneumatic isolator 60 (See, e.g., FIG. 4), vertical restraint actuator subsystem 100 (See, e.g., FIGS. 6 and 7), and a horizontal restraint actuator subsystem 200 (See, e.g., FIG. 8). Platform 12 supports machine 300 (e.g., a shaker) controlled by controller 302 via signals to current amplifier 304.

Controller subsystem 80 (which may include digital controller 80a and frequency monitoring device 80b with double integration electronic circuits)) receives and is responsive to a signal representing the frequency of machine 300.

Controller subsystem 80 is configured to adjust isolator 60 between the soft and stiff modes via controller valve 62 depending on the frequency of machine 300. For example, the natural frequency of the platform and isolators in the soft mode is known as is the natural frequency of the platform and isolators in the stiff mode of operation.

If the frequency of machine 300 approaches or is near the natural frequency of the platform in the soft mode, controller subsystem 80 activates valve 62 to switch isolator 60 to the stiff mode. At all other times, controller 80 actuates valve 62 to switch isolator 60 to the soft mode. In this way, resonance magnification is avoided.

In this particular example, a first channel of digital logic control unit 80a receives a signal from shaker controller 302. The second channel of the digital logic control unit receives a signal from the double integration circuit in frequency monitoring device 80b. Both channels of digital logic control unit 80a may include analog to digital data collection cards. The absolute value of the amplitudes of the two signals (input and output) of the double integers should have a precise ratio equal to the square of the angular frequency of the by-passed shaker controller input signal. Through this process, unit 80a is programmed to determine the frequency of the input signal instantly and to engage or disengage the dual modes or rigid support mode of the isolation system. The ratio of the angular frequencies should be the same power of the difference of the order difference in the integration device.

Controller subsystem 80 may also be configured to "lock out" the system (e.g., rigidly support the platform) by activating solenoid 124 and/or solenoid 208 to engage the vertical and/or horizontal restraint actuators if the frequency of machine 300 reaches a predetermined frequency and/or amplitude which could adversely affect the testing process or damage the system and/or its components and to prevent resonance magnification.

Frequency monitoring device 80b preferably includes an electronic double integration circuit which receives a signal from the shaker controller 302 and identifies the shaker's frequency of operation. Digital logic control unit 80a receives a signal from frequency monitoring device 80b provided to a first channel of digital logic control unit 80a which has two or more channels of analog to digital data collection cards. Controller 80a via second channel receives a signal from a double integration circuit in the frequency monitoring device 80b. The absolute value of the amplitude of the two signals should have a precise ratio equal to the square of the angular frequency of the by-passed input signal, thus through this process unit 80a is programmed to determine the frequency of the input signal instantly and to engage and disengage the dual/multiple mode or rigid support mode of the isolation system. The ratio for the angular frequency should be same power of the difference of the order difference in the integration device.

Controller 80 may also be programmed to "lock out" the system by activating solenoid 124 and/or solenoid 208 to engage the vertical and/or horizontal restraint actuators if the frequency of machine 300 reaches a predetermined frequency and/or amplitude which could jeopardize the testing process or damage the system and/or its components and to prevent resonance magnification.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A vibration isolation system comprising:
a platform;
a plurality of isolators for supporting the platform, electronically switchable between a soft mode of isolation resulting in a first natural frequency and a stiff mode of isolation resulting in a second natural frequency, wherein each of said plurality of isolators includes a flexible diaphragm, a first chamber supporting the flexible diaphragm, a second chamber serving as a reservoir, and a valve connected to an air supply, to the first chamber, and to the second chamber and operable to by-pass the second chamber to more quickly direct the supply to the first chamber; and
a controller responsive to a signal representing the frequency of a machine on the platform and configured to:
switch the isolator to the stiff mode of operation when the frequency of the machine approaches or reaches, the first natural frequency to avoid resonance magnification, and
otherwise switch the isolator to the soft mode of operation.

2. The system of claim 1 further including one or more actuator subsystems positioned to rigidly support the platform.

3. The system of claim 2 in which the controller is further configured to activate the actuator subsystem in response to a predetermined machine frequency.

4. The system of claim 1 in which the controller subsystem is configured to process a machine control input frequency and an integrated machine frequency signal from an integration circuit.

5. The system of claim 1 in which the valve is electrically controlled.

6. The system of claim 5 in which the valve is configured to bypass second chamber when de-energized.

7. The system of claim 5 in which the valve is connected to the second chamber via a first restriction and via a connection.

8. The system of claim 7 in which the valve is connected to the first chamber via a second restriction.

9. The system of claim 8 in which the first and second restrictions are air lined coils.

10. The system of claim 1 in which the controller is configured to control the valve based on an input signal.

* * * * *